United States Patent

Clark et al.

[15] 3,643,012

[45] Feb. 15, 1972

[54] RAPID FRAME SYNCHRONIZATION OF VIDEO TAPE REPRODUCE SIGNALS

[72] Inventors: Harold V. Clark, Palo Alto; Gary B. Garagnon, Redwood City, both of Calif.

[73] Assignee: Ampex Corporation, Redwood City, Calif.

[22] Filed: Feb. 16, 1970

[21] Appl. No.: 11,473

[52] U.S. Cl. .....................178/6.6 A, 178/6.6 P, 178/69.5 F, 179/100.2 B, 307/269, 328/134

[51] Int. Cl. .................G11b 15/48, G11b 27/00, H04n 5/78

[58] Field of Search ..........178/6.6 A, 6.6 P, 69.5 F, 69.5 TU; 307/269; 328/63, 72, 134, 155; 179/100.2 B

[56] References Cited

UNITED STATES PATENTS

| | | | |
|---|---|---|---|
| 3,164,777 | 1/1965 | Guanella | 328/134 |
| 3,510,590 | 5/1970 | Golla | 328/134 |
| 3,441,342 | 4/1969 | Ball | 307/269 |
| 3,141,065 | 7/1964 | Luther | 178/6.6 P |
| 3,017,462 | 1/1962 | Clark | 178/6.6 P |

*Primary Examiner*—Howard W. Britton
*Attorney*—Robert G. Clay

[57] ABSTRACT

In order to rapidly synchronize each video frame of a video tape playback signal with a controlled frequency reference signal, signal information having a higher periodic rate than that of the frame or vertical synchronization is used as a time measure of the phase separation between playback signal framing pulses and reference framing pulses. The higher rate information is provided by a control track reproduce signal corresponding to the rotational rate of a rotary magnetic head wheel during playback of the video signal. The high-rate control track signal and a reference signal of corresponding frequency are used to develop separate digital count measurements of the time lapse following the respective reproduce and reference frame pulses, and a digital difference count is taken therefrom. The digital difference count, being a measure of the phase separation, is converted to analog form and thereafter employed to make suitable corrections to the playback rate of the tape transport to cause the video playback signal to assume a condition of frame synchronization with the reference standard.

14 Claims, 3 Drawing Figures

Figure 1:
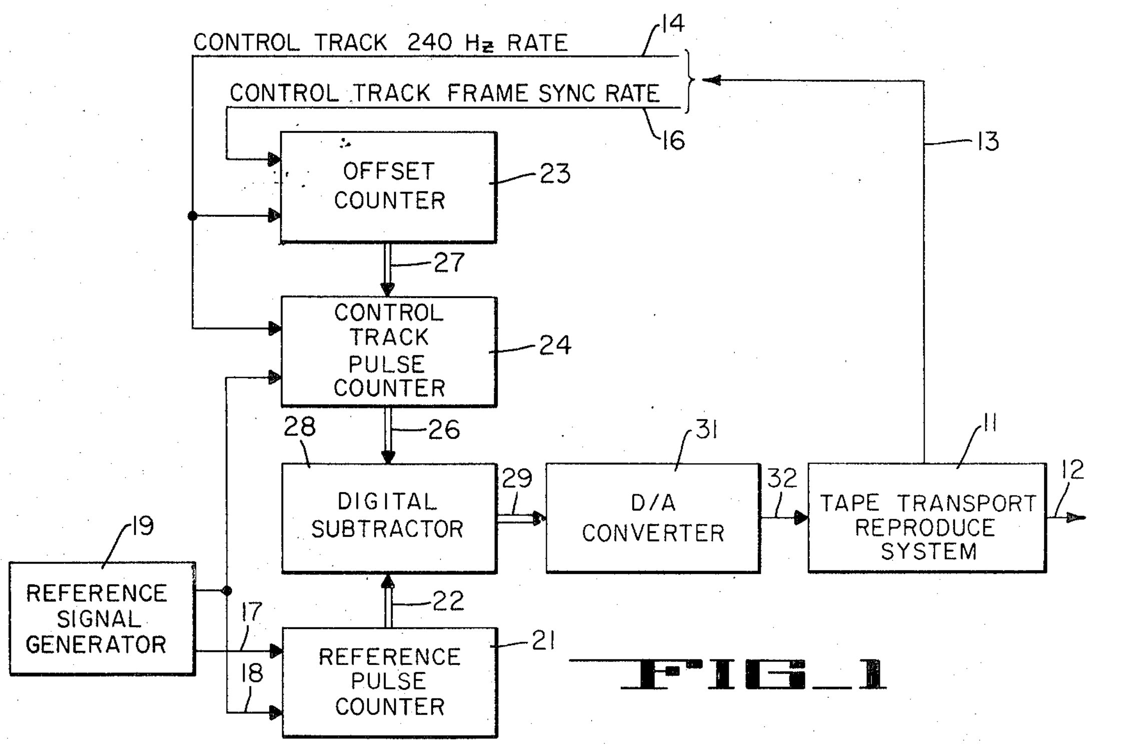

INVENTORS
HAROLD V. CLARK
GARY B. GARAGNON
BY
Larry A. Jackson
ATTORNEY

INVENTORS
HAROLD V. CLARK
GARY B. GARAGNON

BY Larry A. Jackson
ATTORNEY

RAPID FRAME SYNCHRONIZATION OF VIDEO TAPE REPRODUCE SIGNALS

The present invention relates to signal synchronizing systems and more particularly to a method and apparatus for synchronizing the rate and phase of video signal frame information with a reference signal or another video signal.

In the reproduction of video signals prerecorded on videotape, a variety of sophisticated control and feedback systems are employed to adjust the rate of the playback video signal so that it is synchronized with another video signal. Generally, this is achieved by systems providing for synchronizing the playback video signal and the other video signal to a common reference timing signal having synchronizing pulses or waveforms corresponding to those of a standard video signal. To facilitate this synchronization process, a control track signal is usually recorded along with the prerecorded video information signal, wherein the control track signal is comprised of signal information corresponding to the rotational rate of rotary magnetic heads and pulse information corresponding to the video frame (vertical synchronization) waveforms. In an exemplary arrangement, means are provided for sensing phase differences between the control track frame pulse rate and the corresponding reference frame pulse rate during playback of the video signal and, based on this phase measurement, an error signal is generated for adjusting the playback speed of the transport mechanism to provide the desired synchronization. As the frame or vertical sync waveforms occur at the slowest rate among the various signals, it is necessary to first achieve frame synchronization, called framing, before proceeding with finer synchronization of the relatively higher frequency signal components. In accordance with the operation of these prior systems, each synchronizing operation proceeded at basically the same information rate as that of the signal components to be synchronized. Thus, frame synchronization proceeded at the frame pulse rate and, when completed, higher frequency components were synchronized. As an example of the different rates involved, vertical sync pulses occur at a 30 Hz. frequency while the control track head wheel synchronizing signal has a frequency of 240 Hz.

While systems operating in accordance with the foregoing schemes are entirely adequate in many situations, it is nevertheless desirable to improve the speed and reliability of performance of videotape playback synchronizing equipment such that a greater degree of picture stability is achieved for modern high quality broadcasting.

Accordingly, it is an object of the present invention to provide a method and apparatus for bringing the video frames of a prerecorded video playback signal into synchronization with a reference signal in a shorter time and with a greater degree of reliability than heretofore provided by known synchronizing systems.

These and other objects are achieved, in accordance with the present invention, by deriving the error signal used to bring the video playback signal and reference signal into synchronization from the higher rate signal information available from the standard control track. In particular, digital counts are accumulated of the number of periods of the high rate control track and reference signals following the respective frame synchronizing pulses. The digital count in each case represents the amount of time which has lapsed from the corresponding preceding vertical sync pulse. The reference and control track counts are continuously subtracted by a digital subtractor in order to generate a digital difference signal representing the phase error between the playback signal frame pulses and the reference frame pulses. This digital difference signal is thereupon transformed by a digital-to-analog converter into an analog error signal used in the servo circuitry of the transport for adjusting the playback rate of the video signal so as to rapidly achieve frame synchronization. As the error signal used for controlling the video playback rate is derived from the higher rate control track information, framing is achieved more rapidly than systems which perform a correction based on the lower rate frame or vertical sync pulse information.

Figure 2:
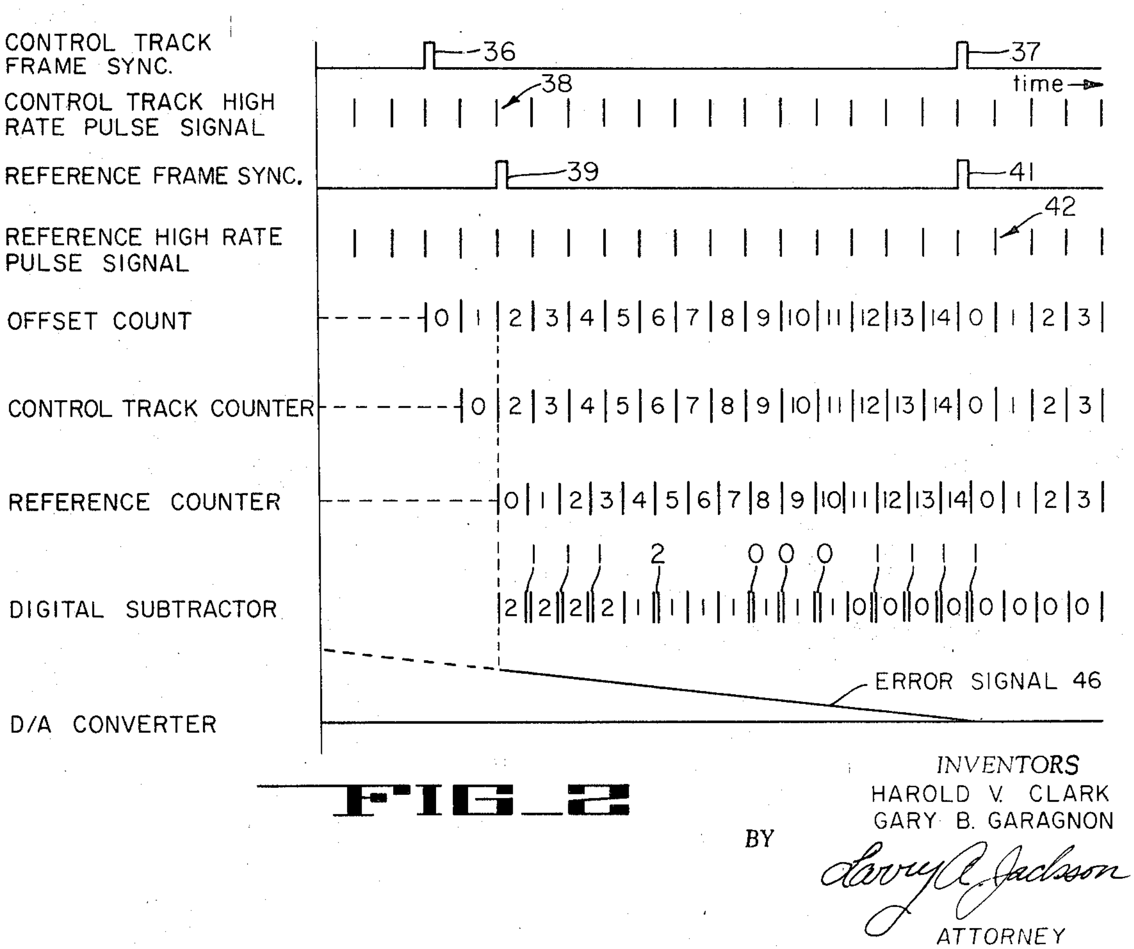
Figure 3:
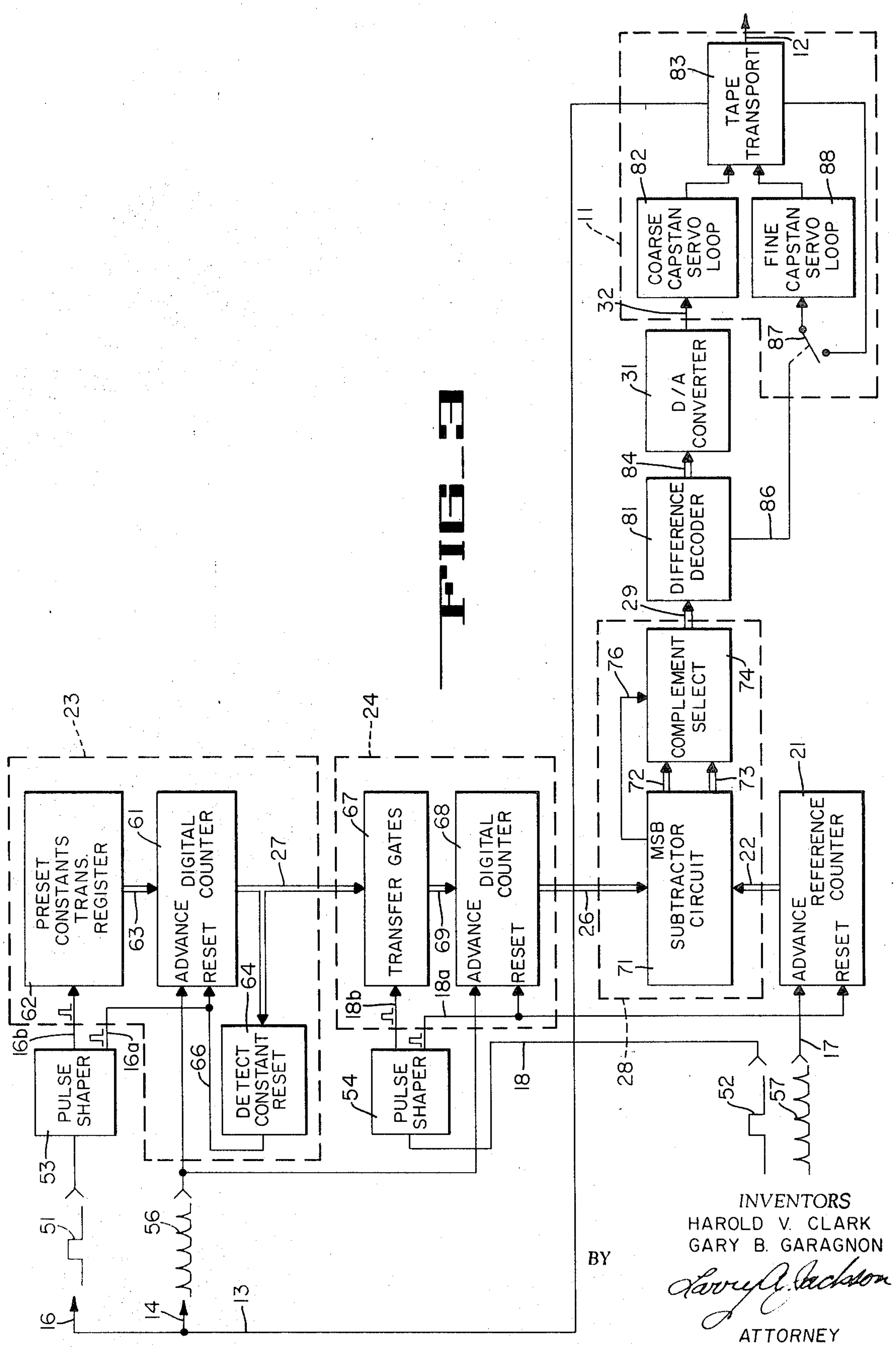

These and other objects, features and advantages of the invention will become apparent from the following description and accompanying drawings respectively describing and illustrating the preferred embodiment thereof, wherein the drawings include:

FIG. 1 which is a generalized block diagram illustrating the signal synchronization method and apparatus of the present invention in the environment of a videotape playback transport system;

FIG. 2 which is a graph showing various waveforms and switching states occurring within the block diagram system of FIG. 1 during a synchronizing operation thereof; and FIG. 3 which is a detailed block diagram of the components employed in a preferred working embodiment of the invention.

With reference to FIG. 1, the present invention is illustrated in conjunction with a frame synchronizing servosystem for playback of prerecorded videotapes. For this purpose, a tape transport reproduce system 11, including a capstan servosystem not specifically shown, provides for issuing a video playback signal at output 12 and concurrently therewith issues a reproduce control track signal over line 13. The control track signals as is known, is comprised of at least two basic signal components: A relatively high frequency signal corresponding to the rotational rate of a rotary magnetic record/reproduce head wheel of the transport and a lower frequency signal corresponding to the timing rate of the frame synchronizing pulses of the video signal. Alternatively, the vertical frame pulses may be derived directly from the reproduced video signal rather than from a separately recorded and reproduced control track signal. Exemplary systems are shown in U.S. Pat. No. 3,141,065 and No. 3,097,267.

The relatively high and low frequency components are separated from one another as diagrammatically illustrated by FIG. 1, wherein line 13 branches into a line 14 for the high rate periodic timing signal and a line 16 for the lower rate framing waveforms. While the control track signal is a measure of the instantaneous rate at which the video signal appearing at output 12 is being played back, the desired or required rate of such signal is represented by an externally generated reference signal, which like the control track signal carries both high rate of information timing waveforms corresponding to the high rate control track signal and relatively lower frequency timing waveforms corresponding to the frame rate. These two components of the reference signal are respectively applied to lines 17 and 18 as shown by FIG. 1. The high and low rate reference signals presented to lines 17 and 18 may be provided by a crystal controlled or otherwise stabilized reference signal generator 19 as shown, or such signals may be obtained from another video signal. Once the playback signal from system 11 is properly synchronized to the reference signal from generator 19, other video signals similarly controlled by generator 19 are necessarily synchronized to the video output of tape reproduce system 11.

Now, in accordance with the present invention, method and apparatus are provided for rapidly obtaining synchronization between the relatively low rate frame synchronizing waveforms of the control track and corresponding waveforms from the reference signal. In particular, a first electrical counter 21 is disposed to receive both the high and low rate synchronizing information over lines 17 and 18 from reference signal generator 19. In response thereto, counter 21 develops a digital count word at output connection 22 representing the number of high rate timing waveforms received from generator 19 following each low rate timing waveform, that is following each waveform corresponding to the reference frame sync pulse. A second counting means, comprising an offset counter 23 and a high rate control track counter 24, is provided to register a binary word representing the number of high rate timing waveforms occurring after each low rate control track waveform, namely the frame syno pulse of the video output. A digital word is provided at output connection 26 of counter 24 corresponding to the instantaneous count registered thereby. The provision of offset counter 23 with an output connection 27 extending to counter 24, serves to allow counter 24 to continue to register high rate information counts after the next control track frame sync pulse without loss of counting information as discussed more fully herein.

The digital word outputs appearing at connections 22 and 26 are subtracted from one another by means of a digital subtractor 28 which thereby issues at output connection 28, a digital difference word representing at any given instance the phase separation between control track framing pulses and reference framing pulses. As the difference word thus provided is developed and continually renewed at the relatively high information rate rather than at the frame sync rate, it assumes a value accurately reflecting the instantaneous framing error at or near startup and responds more quickly to phase deviations between the control track and reference frame sync waveforms. A digital-to-analog converter 31 is provided for responding to the binary difference word at output connection 29 and issuing an analog signal to line 32 having a variable amplitude representing the count difference. Line 32 is extended to system 11 and functions therein to provide an error signal for rapid servoing of the tape capstan drive, and concomitantly the rate of rotation of the rotary magnetic head wheel, such that the video playback signal at output 12 assumes a proper rate and phase for time positioning the frame sync pulses with corresponding waveforms of the reference signal.

The foregoing operation is clearly demonstrated by the waveforms shown in FIG. 2, wherein successive pulses 36 and 37 represent the periodic timing waveforms corresponding to the control track frame pulses and wherein pulses 38 represent the higher rate timing waveforms of the control track signal. Similarly, pulses 39 and 41 are representative of the reference frame synchronizing waveforms while pulses 42 correspond to the high rate reference signal component. Referring also to FIG. 1, offset counter 23 responds to the occurrence of a control track framing pulse, such as pulse 36, to initiate counting of pulses 38 wherein the number of such counted pulses correspond to the bracketed numerals of FIG. 2 shown opposite the legend OFFSET COUNT. Thus counter 23 always provides a count starting from each control track frame synchronizing waveform. To provide a corresponding count of pulses 42 following each reference frame pulse, such as pulse 39 of FIG. 2, counter 21 begins counting the higher rate pulse signal in response to each such reference frame pulse.

As the difference in registered counts thus accumulated is taken by subtractor 28, means are provided by the combination of counters 23 and 24 to avoid discontinuities in the count difference due to the maximum-to-minimum excursion following each control track frame pulse. In particular, counter 24 is responsive to each reference frame sync pulse such as pulse 39 to register the instantaneous count previously accumulated by offset counter 23 thereby allowing counter 24 to continue to accumulate pulse counts beyond the succeeding control track frame pulse, such as pulse 37, while at the same time releasing offset counter 23 to start a new count. Offset counter 23 is adapted to be reset at or prior to each control track frame pulse while counter 24 is adapted to be reset via line 18 by each reference frame pulse. With both of counters 21 and 24 timed with respect to each reference frame pulse, digital subtractor 28 develops a difference time word at output connection 29 which is continually changing in accordance with the amount of phase difference between the high rate of information timing pulses 38 from the control track and the corresponding timing pulses 42 from the reference signal generator. Digital-to-analog converter 31 in turn transforms the digital word into a amplitude variable analog error signal 46 as shown by FIG. 2 for suitably adjusting the servo of reproduce system 11 to provide the proper playback rate. Thus, the exemplary waveforms of FIG. 2 show an error signal 46 decreasing as the control track and reference frame vertical sync pulses are brought into phase coincidence. This is demonstrated by the transition of the frame pulses from their previously out-of-phase orientation as shown for pulses 36 and 39 to an in-phase synchronized condition as shown by pulses 37 and 41.

With reference to FIG. 3, a detailed block diagram is shown of a preferred form of the invention for effecting the operations diagrammatically and generally shown by FIGS. 1 and 2. The circuitry of FIG. 3 is adapted to respond to control track and reference frame pulses, such as pulses 51 and 52, having a nominal rate of 30 pulses per second in accordance with a standard video signal. Each pulse of the respective framing pulse trains presented on lines 16 and 18 are transformed by pulse shapers 53 and 54 respectively, into a pair of time spaced pulses corresponding to the leading and trailing edges of the incoming frame pulse. Pulse shapers 53 and 54 thus issue leading edge pulses over lines **16*a* and 18*a* corresponding to the control track and reference pulse signals respectively, and trailing edge pulses over lines 16*b* and 18*b*. This breakdown of the incoming pulses serves to provide phased trigger pulses for initiating the various switching operations performed in response to the framing pulses 51 and 52** for reliably functioning of the system.

The higher rate timing information, as noted above, corresponds to the rotational rate of the transverse scan rotary head wheel which for a standard transport is 240 cycles per second. In the present embodiment of the invention, this timing signal is represented on the tape control track by a recorded 240 Hz. signal. Reproduction of this signal results in a series of pulses representing the zero crossings of the recorded signal, such that the playback control signal occurs at a rate twice the frequency of the originally recorded signal, or 480 Hz. The pulse train thus produced, such as shown by pulse train 56, has a pulse at each zero crossing of the original signal. Pulses of corresponding time spacing are provided by generator 19, such as shown by pulse train 57.

Offset counter 23 as shown by FIG. 3, comprises a digital counter 61 having an advance input responsive to the 480 Hz. pulse train 56 for advancing in count in response to each pulse thereof, and a reset input responsive to the early or leading edge pulse of control track pulse 51 over line **16*a*. Thus, at the start of each control track frame pulse, counter 61 and the binary word output connection 27 therefrom are set to zero or a preselected minimum count level. The preselected minimum count level is preferred so that a synchronized condition results in a nonzero digital word output from subtractor 29 thereby avoiding the necessity of positive and negative direction indicators where the control track and reference frame pulses pass through a coincident relation. A preset constants register 62 is provided having a binary word connection 63 to digital counter 61 for presetting counter 61, in response to a trailing edge control track frame pulse received over line 16*b*, with a predetermined binary word having a count level reflecting the particular video system in use. The three basic video systems for which the present embodiment is adapted are the American or 525 lines per frame and the two European systems of 625 low and 625 high lines per frame. The preset binary word count provided by register 62 in each of these instances serves to dispose counter 61 at a level midway between the number of high rate pulses 56 occurring between consecutive frame pulses 51. For example, for the 525 lines per frame American system, preset register 62 in response to the trailing edge of pulse 51 stores counter 61** with a count level of seven approximately corresponding to one-half of the 16 high rate information pulses which occur between adjacent control track framing pulses.

Offset counter 23 further comprises a detect constants reset circuit 64 having an input responsive to the binary condition of counter 61 via connection 27 and an output line 66 extending to the reset input of counter 61 such that counter 61 is reset in the alternative by either reset circuit 64 or the leading edge of pulse 51 from pulse shaper 53. Reset circuit 64 serves to limit the advancement of count of counter 61 to a maximum level known to occur subsequent to the next reference frame pulse following that reference frame pulse against which the control track frame pulse is to be measured. This operation is advantageous in that it prevents large erroneous counts from being developed on counter 61 by reason of occasional disruptions or discontinuities in the control track frame pulse train. The type of discontinuities of concern here may be caused for example by tape splices which interrupt the normal spacing between frame pulses, or by loss of a single control track frame pulse due to a tape "drop out."

Control track high rate information counter 24 as shown by FIG. 3 is comprised of transfer gates 67 which are responsive to the trailing edge of reference frame pulse 52 via pulse shaper 54 to transfer the binary word carried at that instance by counter 61 into digital counter 68 over binary word connection 69 as shown. Thus digital counter 68, starting from the pulse count previously accumulated by counter 61, continues counting the control track 480 Hz. pulses of pulse train 56 following the trailing edge of reference frame pulse 52. Pulse train 56 is received by counter 68 at the advance input thereof. Also, counter 68 is provided with a reset input responsive to the leading edge of frame pulse 52 over line 18*a* from shaper 54 to reset counter 68 to zero immediately prior to receiving the binary word count from digital counter 61 at the trailing edge of pulse 52. In this manner, counter 68 develops the binary pulse count of the number of 480 Hz. zero crossings of the high rate control track signal following each control track frame pulse 51, wherein such binary word appears at output connection 26 and upon which subtractor 28 performs the arithmetical operation.

Reference high rate pulse counter 21 as shown by FIG. 3 is provided with an advance input receiving the high rate reference pulse train 57 for line 17 and a reset input responsive to the leading edge of each reference frame pulse 52 over line 18*a* from pulse shaper 54. Accordingly, the digital word appearing at connection 22 is always a measure of the time lapse following the last reference frame pulse based on the reference high rate signal.

While in the illustrated embodiment, the reference high rate signal is shown to be provided directly from reference source 19, in the alternative such signal may be taken from the head wheel tachometer of the transport (not shown). As the head wheel is in turn normally synchronized to the high rate reference signal, the effective operation of the system is much the same, although with this alternative arrangement any phase difference between the reference high rate signal and the signal from the head wheel tachometer is eliminated from the framing servo loop.

Digital subtractor 28 is of a known construction and, as shown by FIG. 3, comprises a subtractor circuit 71 responsive to the binary words appearing at connections 22 and 26 to develop a binary difference word at a first output connection 72 and the word complement thereof at a second output connection 73. A complement select network 74 receives output connection 72 and 73 from subtractor circuit 71 and in response to still another signal from circuit 71 over line 76 representative of the most significant bit of the difference word, performs a complement select function. A binary difference word is provided at output connection 29. Complement select network 74 provides an appropriate and known conversion of the binary word output from subtractor circuit 71 such that positive and negative differences in the counts accumulated by counters 21 and 68 are reflected only by an absolute difference count.

The binary difference word output available at connection 29 appears in analog form at the output of digital-to-analog converter 31 after being fed through a difference decoder 81. A portion of the servo circuitry of transport 11 shown as the coarse capstan servo loop 82 responds to the error or corrective analog signal on line 32 and causes an appropriate increase or decrease in the speed of the capstan drive (not shown) of transport 83. As the correction rapidly takes effect, the magnitude of the error signal on line 32 decays to a nominal or zero value. In the present embodiment, the tape transport is of the transverse scan rotary head wheel class, in which the servo circuitry controlling the movement of the capstan drive (not shown) cooperates in a known manner with the rotary head wheel (not shown) such that a change in the rotary head wheel rotation also effects a corresponding change in the capstan drive to maintain appropriate speed and phase relation therebetween.

In accordance with the present invention, digital-to-analog 31 may be provided by any of a variety of known designs. For example, with reference to FIG. 2, the output of digital-to-analog converter 31 is shown to provide a smooth continuous function in response to a changing binary word input. Alternatively, converter 31 may be constructed so as to issue an analog signal having a step change in magnitude and polarity in accordance with the transition between predetermined threshold levels of the binary difference word. For example, when the circuitry is set for an NTSC signal having 525 lines per frame, there are 8 revolutions of the rotary head wheel per frame and thus 16 zero crossings of the 240 Hz. control track signal. With preset constants register 62 being set to store a count of seven or eight on digital counter 61 in response to the control track frame pulse, such as pulse 51, the output from subtractor 28 will exhibit a digital word vacillating between seven and eight when the control track and reference frame pulses are synchronized. In response thereto, comparator 31 may be set to issue a zero amplitude corrective signal over line 32 so long as the binary word registers seven or eight and to provide a step positive or negative voltage signal when the binary word changes to six and lower or nine and higher respectively.

Difference decoder 81 performs two separate but related functions. The first, decoder 81 serves to normalize the binary word output at connection 29 to provide at output connection 84 a word which is a true binary word measure of the desired correction to be performed by converter 31. Depending on the standard of the video signal, different binary word levels represent a synchronized condition. That is, as the signal standard is changed at register 62, the output binary word at connection 29 also changes and this variance between the various signal standards must be taken into account prior to converter 31. Thus, difference decoder 81 reduces the various binary word inputs to a binary word having a common modulus versus phase error relationship so that converter 31 always functions to provide the proper magnitude error signal to coarse capstan servo loop 82.

Difference decoder 81 also performs another distinct operation in that the pair of binary states adjacent to or associated with a frame synchronized condition are detected by decoder 81. In response thereto a switching signal is issued over line 86 to a switching device 87 of system 11. Switching device 87 operates to either open or close a serial connection with a fine capstan servo loop 88 functioning in combination with transport 83 to phase lock the control track 240 Hz. signal with the reference 240 Hz. signal. As this phase lock must not occur until the respective control track and reference signals assume a proper phase relation out of a number of possible phase relations, it is necessary that the fine loop 88 be maintained in an open condition until a certain degree of presynchronization between the signals has been achieved. This presynchronization is satisfied when the binary word output from digital subtractor 28 indicates that the control track and reference frame pulses are synchronized, or at least synchronized within the error limits of the adjacent binary difference signal levels. In this view, decoder 81 functions to issue a signal over line 86 which opens switching device 87 when the binary difference word available at connection 29 is outside a preselected range of binary states adjacent a condition of synchronization between the respective framing pulses. When the binary word enters this preselected range, decoder 81 issues a signal closing switching device 87 and thus initiating operation of fine loop 88 for phase locking the 240 Hz. control track and reference signal. Difference decoder 81, like converter 31 and preset register 62, has several different loads depending upon the signal standard for which the system is used. As an example, the above-mentioned preselected binary word range for the American 525 lines/frame signal system may be set at the seven and eight bit levels which correspond to the difference count states immediately adjacent a frame synchronized condition.

What is claimed is:

1. A system for synchronizing signals having corresponding relatively high rate periodic timing waveforms and relatively low rate periodic timing waveforms comprising;
   - first electrical counter means adapted to receive a first of said signals and being responsive thereto to count the high rate timing waveforms occurring after each of the low rate timing waveforms thereof;
   - second electrical counter means adapted to receive a second of said signals and being responsive thereto to count the high rate timing waveforms occurring after each of the low rate timing waveforms thereof;
   - electrical subtractor means connected to said first and second counter means and being responsive thereto to issue a signal representing the instantaneous difference in counts registered thereby, and
   - signal rate control means connected to said subtractor means and responsive to the signal issued thereby for adjusting the rate of one of said first-mentioned signals to obtain a desired phase relationship between said low rate timing waveforms thereof.

2. The system as defined in claim 1 wherein said first and second counters are digital counters and said subtractor is a digital subtractor and further comprising a digital-to-analog converter responsive to the output of said digital subtractor to develop an analog error signal having a magnitude and polarity representing a phase error between said second rate pulses of said first and second signals.

3. The system as defined in claim 1 wherein said first counter comprises an offset counter for counting high rate waveforms after each low rate waveform of said first signal and a principal counter connected to receive the count registered by said first counter in response to a low rate signal waveform and said principal counter continuing to count high rate first signal waveforms from the offset count until a succeeding low rate second signal waveform.

4. The system as defined in claim 3 further comprising a reset means responsive to a preselected maximum count on said offset counter means for resetting such counter to a preselected minimum count.

5. In a servo circuit for a tape transport having a coarse feedback correction network for synchronizing a relatively low rate reproduce timing pulse signal with a corresponding low rate reference pulse signal and fine feedback correction network for synchronizing a relatively faster rate reproduce timing pulse signal with a corresponding relatively high rate reference pulse signal, said coarse feedback correction network comprising in combination with said fine feedback correction network:
   - a first counting means counting the number of higher rate reproduce pulses following each lower rate reproduce pulse,
   - second counting means counting the number of higher rate reference pulses following each lower rate reference pulse,
   - subtracting means connected and responsive to the counts registered by said first and second counting means to issue a signal representing the count difference therebetween,
   - digital-to-analog converter means responsive to the output of said subtracting means and being connected in said coarse feedback circuit to issue an error signal for synchronizing said lower rate reproduce and reference timing pulse signals, and
   - switching means connected between the output of said subtracting means and said fine feedback correction network and being responsive to the occurrence of a preselected minimum difference count to initiate operation of said fine feedback correction network.

6. In the circuit as defined by claim 5, said first counting means comprising an offset counter for counting high rate reproduce signal pulses following each low rate reproduce pulse and a principal counter connected to store the offset count in response to each low rate reference pulse and thereafter accumulate high rate reproduce signal pulses, said subtracting means being responsive to the counting state of said principal counter.

7. In the circuit as defined by claim 5, said first and second counting means are comprised of digital counters and said subtracting means is comprised of a digital subtractor.

8. In the circuit as defined by claim 7, said switching means being comprised of a difference decoder connected to the output of said subtracting means and being responsive to preselected digital states thereof to selectively enable or disable operation of said fine feedback correction network.

9. In the circuit as defined by claim 5, wherein said low rate timing pulses represent the vertical synchronizing pulses of a video signal and further comprising pulse shaping means responsive to the reproduce and reference low rate signal pulses to develop trigger pulses in response to the leading and trailing edges of each of such pulse whereby suitable phasing of the switching operations of said first and second counting means is effected.

10. In the circuit as defined by claim 6, further comprising a preset constants register connected to said offset counter for storing a predetermined count on said offset counter in response to each said low rate reproduce signal pulse.

11. Method of synchronizing signals each having timing pulses occurring at a relatively high rate and timing pulses occurring at a relatively lower second rate, comprising:
   - counting the high rate pulses following a lower rate pulse of a first of said signals,
   - counting the high rate pulses following a lower rate pulse of a second of said signals,
   - continuously subtracting one of these counts from the other,
   - adjusting the rate of at least one of said signals in response to the magnitude of the difference provided by the subtracting step such that the difference between said counts approaches a preselected value corresponding to desired phase relationship between the lower rate pulses of said first and second signals.

12. A method as defined in claim 11, further comprising the step of continuing said counting of said high rate pulses of said first signal until the occurrence of a lower rate pulse of said second signal even though there is an intervening lower rate pulse of said first signal.

13. The method as defined in claim 11 wherein said counting steps develop digital signals and said subtracting step develops a digital difference signal and further comprising, the step of converting said digital difference signal to an analog error signal representative of a phase relation between said first and second signals.

14. The method as defined in claim 11, further comprising the step of initiating synchronization of said high rate pulses of said first and second signals only in response to a preselected difference count registered by said subtracting step.

* * * * *